United States Patent [19]

Ishikawa

[11] Patent Number: 4,765,763

[45] Date of Patent: Aug. 23, 1988

[54] METHOD OF CONFIRMING THAT A PATTERN TO BE PRINTED IS A HIGH-DENSITY PATTERN AND DIVISIONALLY PRINTING THE PATTERN, AND A DOT PRINTER WHICH CAN PRINT HIGH-QUALITY, HIGH-DENSITY PATTERNS

[75] Inventor: Takao Ishikawa, Tokyo, Japan

[73] Assignee: Kabushiki Kaisha Toshiba, Kawasaki, Japan

[21] Appl. No.: 841,800

[22] Filed: Mar. 20, 1986

[30] Foreign Application Priority Data

Mar. 27, 1985 [JP] Japan .................................. 60-62304

[51] Int. Cl.[4] ................................................ B41J 3/12
[52] U.S. Cl. ...................................... 400/121; 400/54; 400/322
[58] Field of Search ................ 400/54, 121, 320, 322, 400/323; 101/93.04, 93.05

[56] References Cited

FOREIGN PATENT DOCUMENTS 64569  4/1982  Japan .................................. 400/121
16765  1/1984  Japan .................................. 400/121

OTHER PUBLICATIONS

*IBM Tech. Disc. Bulletin*, by B. R. Cavill et al, vol. 24, No. 11A, Apr. 1982, pp. 5430–5432.

*Primary Examiner*—Paul T. Sewell
*Attorney, Agent, or Firm*—Finnegan, Henderson, Farabow, Garrett and Dunner

[57] ABSTRACT

In a dot printer of the present invention, which is capable of printing a high quality, high-density pattern, input pattern data to be printed is stored in an image buffer RAM. A control determination unit checks whether or not the pattern data stored in the image buffer RAM is high-density data by referring to a determination data unit prior to printing, and determines the required number of times of divisional printing in accordance with the checked result. A printer prints the pattern data stored in the image buffer RAM on the basis of the decision of the control determination unit.

16 Claims, 6 Drawing Sheets

F I G. 2A

F I G. 2B

F I G. 3

| ADDRESS | DATA |
|---|---|
| X X 0 0 | 0 |
| X X 0 1 | 1 |
| X X 0 2 | 1 |
| X X 0 3 | 2 |
| X X 0 4 | 1 |
| X X 0 5 | 2 |
| ⋮ | ⋮ |
| X X F E | 7 |
| X X F F | 8 |

F I G. 4

| ADDRESS | DATA |
|---|---|
| 100~70% | 8 |
| 69~55% | 4 |
| 54~40% | 1 |
| 39~20% | 0 |
| 19~0% | -4 |

METHOD OF CONFIRMING THAT A PATTERN TO BE PRINTED IS A HIGH-DENSITY PATTERN AND DIVISIONALLY PRINTING THE PATTERN, AND A DOT PRINTER WHICH CAN PRINT HIGH-QUALITY, HIGH-DENSITY PATTERNS

BACKGROUND OF THE INVENTION

The present invention relates to a method of confirming that a pattern to be printed is a high-density pattern and divisionally printing the pattern, and a dot printer which can print a series of high-quality, high-density patterns in accordance therewith.

As computers develop, printers have been widely used as one of the terminal devices in computer systems. As the application of printers increases, printer power sources have been reduced in size and weight, with subsequent decreases in costs.

When a high-density pattern such as an all dot (100% duty) pattern is to be printed by a conventional printer (e.g., a 24-pin serial impact dot printer), all the pins are driven at all printing positions in accordance with the pattern. When such high-density patterns are sequentially printed, power consumption increases, resulting in a decrease in the power source voltage. When pin drive voltages are decreased, changes in printing density tend to occur in the printed characters, thereby degrading printing quality. In order to prevent this problem, serial printing of high-density patterns is generally limited. In order to solve the problem of this limitation, power source capacity of the printer is increased, or the decrease in the power source voltage is detected and printing is temporarily stopped.

However, in the former case, the printer itself tends to be large in size, resulting in high costs In the latter case, printer operation is temporarily stopped after detecting the decrease in the power source voltage, or the printer is temporarily switched to divisional printing. As a result, high-duty dot printing is again enabled, without increasing the power source capacity. However, in this latter case, a detector for detecting the decrease in power source voltage is required, resulting in a complicated structure and leading to increased costs. In addition, since printing is temporarily stopped or divisional printing is performed after a decrease in the power source voltage, printing quality immediately before the voltage decrease is degraded.

SUMMARY OF THE INVENTION

The present invention has been made in view of the above situation and has as its object to provide a method of confirming that a pattern to be printed is a high-density pattern, and to provide a dot printer capable of printing a high quality, high-density pattern.

In order to achieve the above objects, a dot printer capable of printing a high quality, high-density pattern comprises:

memor means for storing pattern data to be printed;

printer means for printing the pattern data stored in said memory means and performing divisional printing as needed in accordance with a divisional printing control signal; and control means for controlling readout of data from said memory means, deciding whether or not divisional printing is to be performed from a dot density in a line to be printed in the pattern data stored in said memory means, generating the divisional signal control signal, and controlling said printer means before allowing said printer means to perform printing.

A method of confirming that a pattern to be printed is a high-density pattern and performing divisional printing comprises:

the step (S1) of determining whether or not an area storing the pattern data is empty and completing printing when empty;

the step (S2, S3, S4, S5) of calculating a density of the pattern data in a line to be printed when the area is determined not to be empty by the step (S1), and determining whether or not divisional printing is to be performed; and the step (S5) of executing printing in accordance with the result of the step (S2, S3, S4, S5).

As mentioned above, according to the present invention it is determined whether or not a printing pattern is a high-density pattern, i.e., a high-duty pattern, in accordance with the ratio of the number of ON dots in the printing pattern data. If the printing pattern is determined to be a high-duty pattern, divisional printing is performed in accordance with predetermined divisions. Therefore, a detector for detecting the power source decrease need not be provided, unlike a conventional printer, and the determination is made in accordance with the ratio of the number of dots in the printing pattern. Thus, flexible detection can be performed to meet the limitations of the printer mechanism, e.g., power source capacity. Furthermore, according to the present invention, a high-duty pattern can be detected before the start of printing. As a result, variation in printing quality within a line is prevented.

DETAILED DESCRIPTION OF THE PREFERRED EMBODIMENT

A dot printer according to an embodiment of the present invention will be described with reference to the accompanying drawings.

Figure 1:
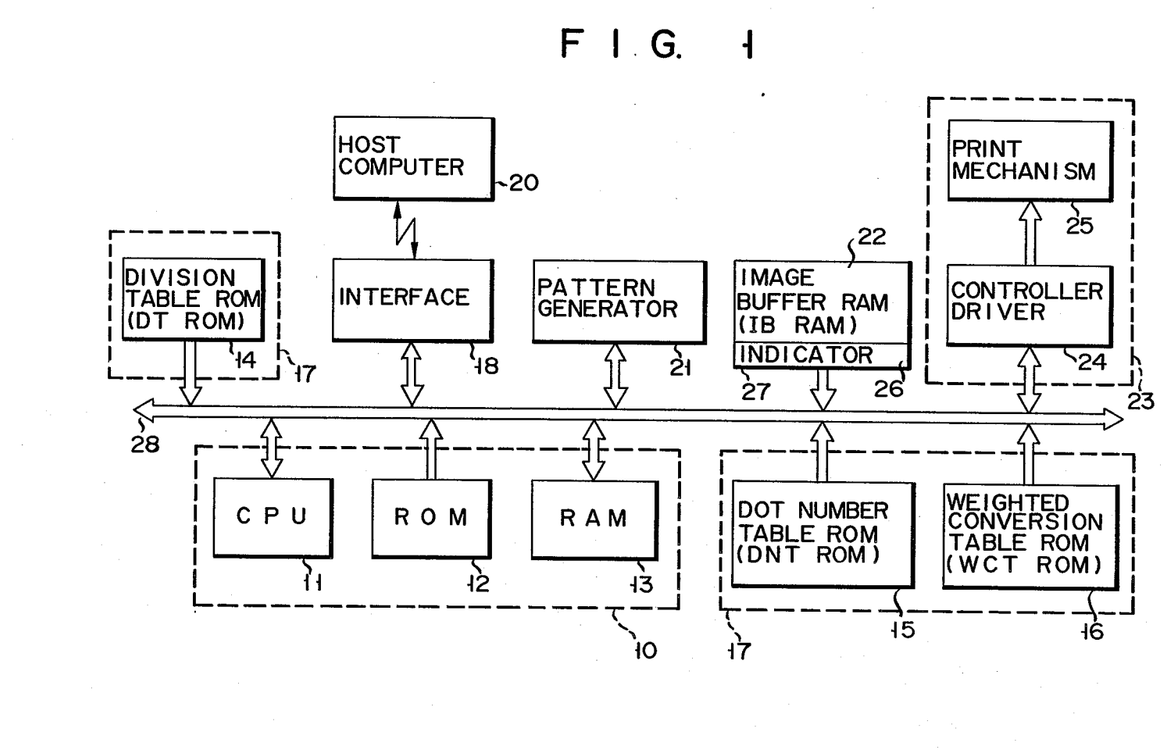
FIG. 1 is a block diagram showing a configuration of a dot printer according to an embodiment of the present invention.

The arrangement of an embodiment of the present invention will first be described with reference to FIG. 1. In general, the dot printer of the present invention has interface 18 for receiving data from an external unit, e.g., host computer 20, pattern generator 21 for generating printing pattern data from a character code received by interface 18 to correspond to the character, image buffer section 27 for temporarily storing the pattern data generated by generator 21, printer section 23 for printing the pattern data, and a control unit (10, 17) for controlling interface 18, pattern generator 21, buffer section 27 and printer section 23, and determining whether or not the pattern data stored in buffer section 27 is high-density pattern data. If the pattern data is determined to be a high-density pattern, the control unit (10, 17) decides the number of divisions for a character to be printed. More specifically, buffer section 27 consists of image buffer RAM (to be referred to as IB RAM hereinafter) 22 for storing the pattern data and indicator 26 for producing a signal indicating whether or not IB RAM 22 is empty. The control unit (10, 17) consists of determination data section 17 having various tables to determine whether or not the pattern data to be printed is a high-density pattern, and control determination section 10 for performing determination of the number of divisions using data from section 17.

Unit 17 comprises dot number table ROM (to be referred to as DNT ROM hereinafter) 15, having a table for calculating the number of ON dots in printing pattern data, weighted conversion table ROM (to be referred to as WCT ROM hereinafter) 16, having a table for calculating the weight from the number of ON dots in one character; and division table ROM (to be referred to as DT ROM hereinafter) 14, provided as needed and having data of the number of divisions for printing. Control determination section 10 consists of CPU 11, ROM 12 storing a control program, and RAM 13 for storing data required for printing. Printer section 23 consists of controller driver 24 and print mechanism 25.

Operation of this embodiment will be described in detail with reference to FIGS. 2 to 9. A data receiving operation will first be summarized. Printing pattern data transmitted from host computer 20 is received by interface 18 and, based on control by section 10, is supplied to generator 21 and converted to pattern data. Converted pattern data is stored in IB RAM 22. Assume that a 24-dot printer is adopted in this embodiment, one pica character consists of 24×18 dots, and one line consists of 136 characters. Pattern data for one line, which is converted as described above, is stored in IB RAM 22 as shown in FIG. 2A. The first character storing state is shown in detail in FIG. 2B, but is not limited to this. In this embodiment, one pica character is divided into 54-byte data, each byte representing eight dots, which are stored in accordance with the data number order shown in FIG. 2B. The 54-byte data constitutes one unit block.

An operation for determining whether the pattern data stored in IB RAM 22 is a high-duty pattern and printing will be described. As shown in the flow chart of FIG. 5, CPU 11 determines in step S1 whether or not pattern data to be printed exists in a pattern data storage area of RAM 22. When empty, the operation ends. When data exists, the flow advances to step S2 to initialize various conditions. For example, variable K indicating an address of byte data read out from IB RAM 22, step S of variable K, variable X used for the addition of the number of dots, variable CH indicating the number of characters read out, step T of variable CH, variable Y used for weighted addition, and variable Ymax indicating a maximum weight are initialized.

Figure 5:
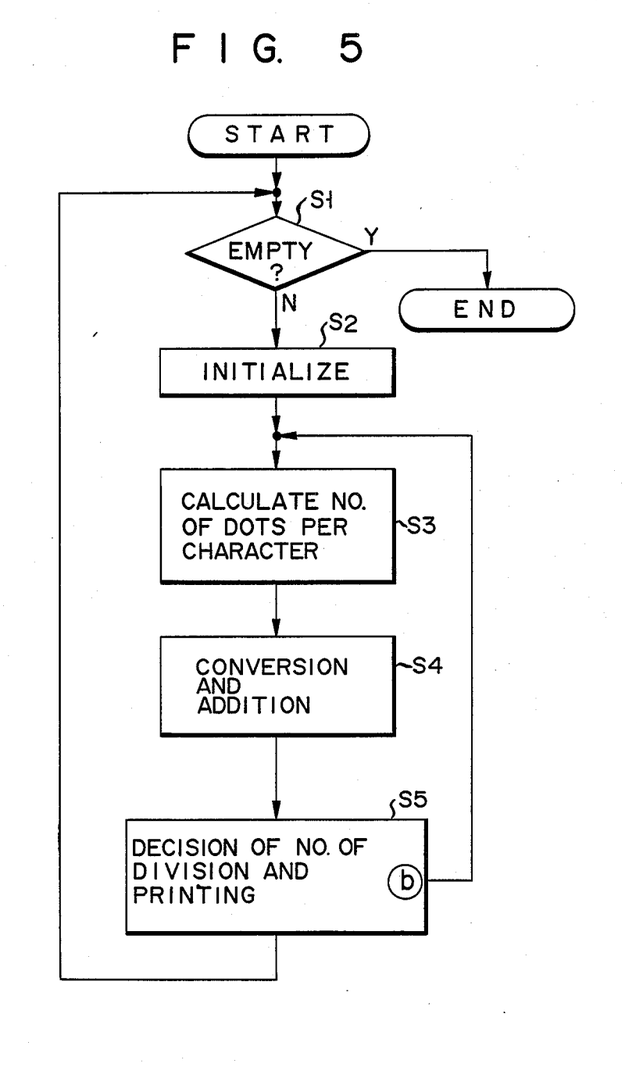
FIG. 5 is a flow chart showing an operation of detecting and printing high-density pattern data in the embodiment shown in FIG. 1.

In step S3, the ratio of the number of ON dots in one block is calculated. In step S4, the weight is calculated from the result of step S3 using a conversion table, and the calculated weight of one line is added. The required number of times of divisional printing is decided in step S5, and printing of the pattern data in accordance with that number is performed. In this manner, a high quality, high-density pattern can be printed.

Figure 2A:
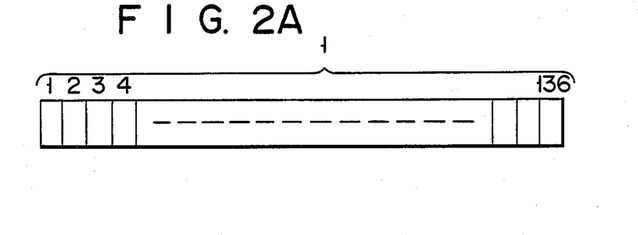
FIG. 2A shows printing pattern data which has a line consisting of 136 pica characters stored in an image buffer RAM of the embodiment shown in FIG. 1.
Figure 2B:
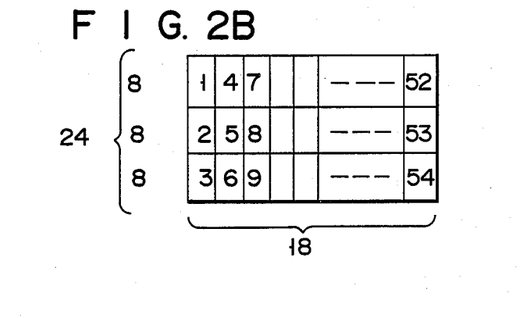
FIG. 2B shows in detail a memory state of printing pattern data for one character.
Figures 6, 7:
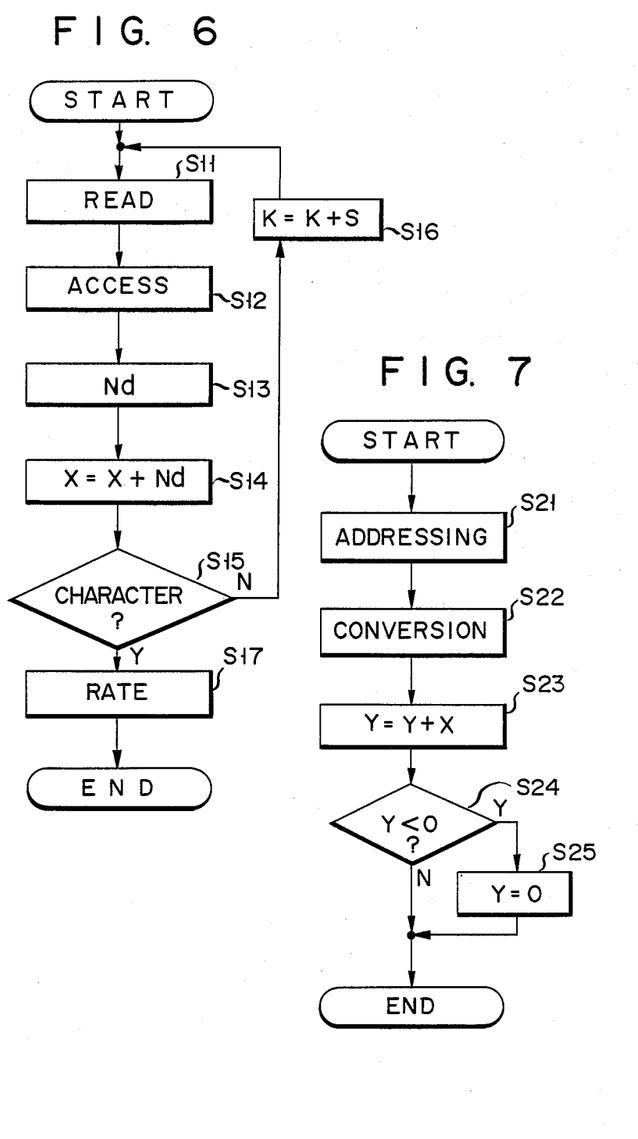
FIG. 6 is a flow chart showing an operation of calculating the number of dots in one character in the flow chart of FIG. 5.
FIG. 7 is a flow chart showing an operation of calculating the weight from the number of dots in one line in the flow chart of FIG. 5.

Step S3 will be described in detail with reference to FIG. 6. Note that variable K is 1. In step S11, one-byte data in IB RAM 22 is addressed, with variable K as its address, and is fetched by CPU 11. In other words, the first data of the data block shown in FIG. 2B is fetched. CPU 11 accesses, in step S12, DNT ROM 15 with this data as part of its address. As a result, Nd, the number of dots of the data fetched by CPU 11, is calculated in step S13. The number of calculated dots corresponds to the number (out of 24) of pins of the printer head which will be used in printing.

Figure 3:
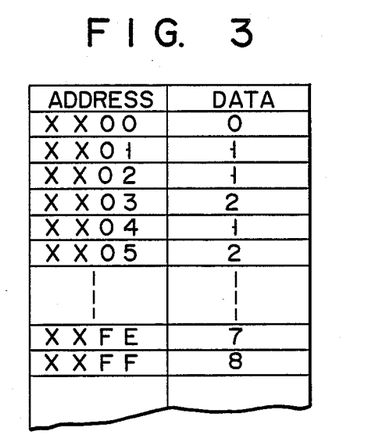
FIG. 3 shows a content of a dot number table ROM of the embodiment shown in FIG. 1.

DNT ROM 15 has a dot number table, as shown in FIG. 3. When the one-byte pattern data fetched by CPU 11 is hexadecimal, e.g., [FE], CPU 11 accesses DNT ROM 15 at an address [XXFE] to obtain data (7) representing the number of ON dots. In this example, hexadecimal [FE] is binary [1111 1110], and the number of dots as data 1 of one character block is 7. The same operation is performed for the other addresses of FIG. 3. [XX] is a predetermined hexadecimal number.

In step S14, CPU 11 adds the obtained value to variable X. When weight calculation of one line was started, variable X was initialized in step S2. Therefore, variable X is now 7. It is discriminated in step S15 whether addition for one block, e.g., one character has been completed. If NO, step S16 is executed. S (1 in this example) is added to variable K (1) to increment it to 2. Subsequently, step S11 is executed to read out the second data of the data block shown in FIG. 2B. If the second data is hexadecimal [03], steps S12 and S13 are performed in the same manner as described above to obtain 2 as the number of dots. 2 is added to variable X in step S14 to increment it to 9 (=7 +2). Step S15 is then executed to determine whether or not calculation for one block has been completed, i.e., if K is 54. Since NO, variable K is incremented by one and steps S11 to S15 are repeated. When calculation for one block is completed (YES in step S15), step S17 is executed to calculate the ratio of the number of dots to be used. If variable X is 288, value W for the ratio is 66 (%) (=100×X/(24×18)). Step S3 thus ends.

Figure 4:
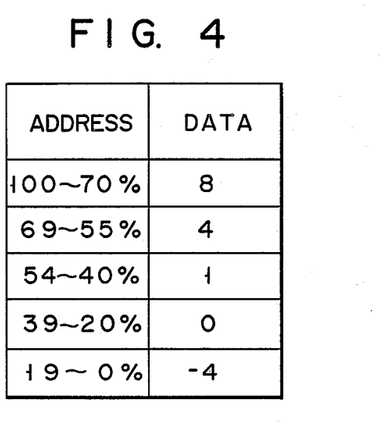
FIG. 4 shows a content of a weighted conversion table ROM of the embodiment shown in FIG. 1.

The step S4 subroutine is then executed and its operation will be described in detail with reference to FIG. 7. CPU 11 accesses WCT ROM 16 at address W (the ratio described above). WCT ROM 16 has a table as shown in FIG. 4. If value W of the ratio is 66%, CPU 11 obtains 4 as a weighting coefficient WC of the character in question (step S22). WCT ROM 16 can be directly accessed at its address W. However, it is more practical to code ratio W before access. In step S23, value WC is added to variable Y. Since variable Y is initialized in step S2, it is now 4. In other words, when the ratio of number X of printing (ON) dots to the total number of dots is high (70 to 100%), 8 is selected as variable Y. Conversely, if the ratio of number X to the total number of dots is low, −4, e.g., is selected. Variable X is preset from a result of experiments. It is determined in step S24 whether or not calculation result Y in step S23 is smaller than 0. If YES, Y is set at 0 in step S25. If NO (Y>0), Y is not changed.

Figures 8A, 8B:
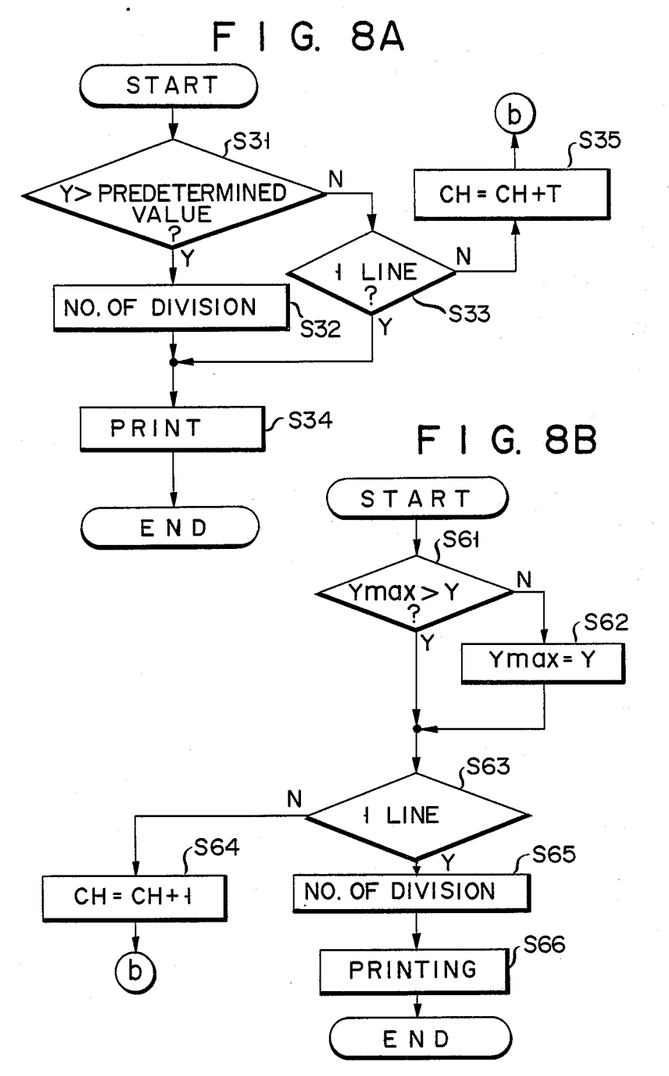
FIG. 8A is an example of a flow chart showing an operation for deciding the number of division-in-accordance with the weight and for printing in the flow chart of 5.
FIG. 8B is another example of such a flow chart.
Figure 9:
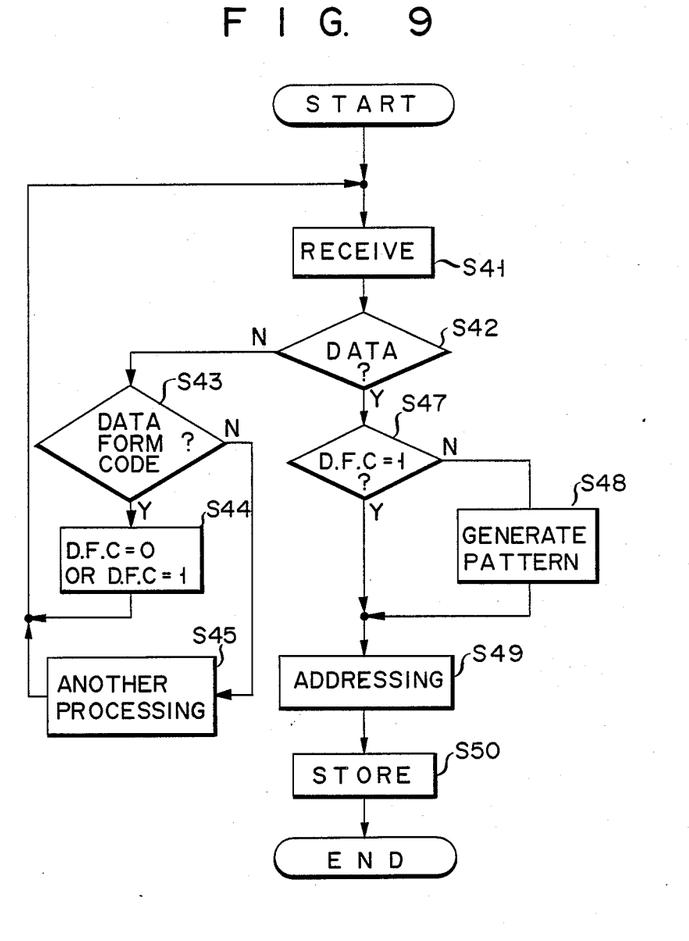
FIG. 9 shows processing of reception data in the embodiment shown in FIG. 1.

Step S5 is then executed and its operation will be described in detail with reference to FIG. 8A. It is determined in step S31 whether or not value Y obtained in step S4 is larger than a predetermined value, e.g., 25. If NO, step S33 is executed to determine whether or not determination for one line has been completed. In this embodiment, since one line has 136 characters, step S33 is executed to determine whether or not variable CH is 136. If NO, step S35 is executed to perform determination for the next character, and value T is added to variable CH. Value T is usually 1, but can take another value. As a result of step S35, variable CH is 2. After execution of step S35, step S3 is re-executed to examine the next character.

If variable Y is higher than the predetermined value in step S31, CPU 11 determines that the printing pattern is a high-duty pattern and stops detection. In step S32, a preset number of divisional printings, e.g., 2 or 3 is determined. When determination for one line is completed (YES) in step S33, the number of printings is determined as 1. Printing is then executed in step S34 in accordance with the determined number of divisions. In this case, CPU 11 designates divisional printing to driver 24 in accordance with the determined printing number. Driver 24 then controls print mechanism 25 to perform divisional printing. Mechanism 25 dot-prints the high-density printing pattern data stored in IB RAM 22 in accordance with the number of divisional printings. Step S1 is then executed again for the next line.

When Y exceeds the predetermined value in step S31, detection is immediately stopped and printing is performed. However, detection can be performed for an entire line and printing can be performed thereafter. This case will be described with reference to FIG. 8B. When weighting variable Y is calculated in step S4, it is determined in step S61 whether or not Y exceeds maximum Ymax detected before. If Ymax≦Y in step S61, step S62 is executed to set Y as Ymax. If NO, Ymax is not changed. In step S63 it is determined whether or not detection for one line has been completed. If NO in step S63, processing similar to step S35 is performed in step S64. If YES, the number of divisions is decided in step S65, in accordance with maximum Ymax of the weighting variables detected in that line. Printing is then performed in step S66 in accordance with the decided number of divisions in a manner similar to that in step S34.

In the above description, the pattern data is a character pattern, and detection is performed for all the byte data of the pattern data. However, the above processing can be altered according to the type of received printing data. This will be described with reference to FIG. 9. Data is transmitted in step S41 from, e.g., host computer 20 and received by interface 18. In this case, it is determined whether or not the data is to be printed and whether the input command concerns the method of the present invention. More particularly, it is determined in step S42 whether the received data is printing data. If NO in step S42, step S43 is executed. In step S43, it is determined whether or not the input command is a one concerning the method of the present invention. If YES in step S43, step S44 is executed, and if NO, step S45 is executed. If data to be transmitted is graphic data, it is signalled, for example, by an escape sequence before data transmission. When data transmission is completed, it is signalled. When data to be transmitted is character code data, it can be transmitted without signalling. Therefore, in step S44, if data to be transmitted next is graphic data, a DFC flag is set to 1. The DFC flag is set to 0 after data transmission. If the received data is character data, it is determined as such in step S42, and step S47 is then executed. In step S47 the DFC flag is checked. If the DFC flag is 1, the received data is graphic data and the byte data supplied from interface 18 is directly written in IB RAM 22. If the DFC flag is 0, the input data is character code data. The character code data is supplied to pattern generator 21 by CPU 11 to generate pattern data. This pattern data is then stored in IB RAM 22. Thereafter, the above-mentioned determination is performed. In this case, the weighting coefficient of the character pattern data is limited. Therefore, the value S of step S16 in FIG. 6 can take a value other than 1, e.g., 4. Calculation speed can be increased in this manner. However, if the data is graphic data, the location therein of a block having a high weighting coefficient cannot be estimated. In this case, above mentioned value S is set to 1, and printing is performed.

What is claimed is:

1. A dot printer for printing high-density patterns with high quality, comprising:
    memory means for storing printing pattern data for one line of patterns to be printed, the printing pattern data comprising at least one block data comprising ON data and OFF data representing ON dots to be printed and OFF dots that are not printed, respectively, each of said block data having associated weight data related to the number of ON data in said associated block data and comprises an associated plurality of sub-block data;
    processing means for preforming a sequential adding operation on the weight data associated with each of the block data in the lines;
    said processing means including a dot number table for generating the number of said ON dots for each of the sub-block data input thereto,
    referring means for sequentially reading out each of said sub-block data in the block data, and for referring to said dot number table to generate the umber of ON dots for the read-out sub-block data,
    dot adding means for sequentially adding the generated number of ON dots in said associated sub-block data for each of said block data to the total number of ON dots in said block data, and
    ratio calculating means for calculating a ratio of the total number of ON dots to the number of dots in the block data to determine the dot density;
    weight data determination means for determining weight data based on a determined dot density;
    adding means for performing the sequential adding operation on the weight data associated with each of the block data in the line;
    determination means for determining hot many times divisional printing should be performed when an added result of the sequential adding operation exceeds a predetermined value during the sequential adding operation; and
    printing means for printing the printing pattern in accordance with a predetermined number of times the divisional printing should be performed.

2. The printer according to claim 1, wherein the printing pattern data is either character pattern data or graphic pattern data, and when the printing pattern data is character pattern data, the block data corresponds to character pattern data for one character.

3. A dot printer for printing high-density patterns with high quality, comprising:

memory means for storing printing pattern data for one line of patterns to be printed, the printing pattern data comprising at least one block data comprising ON data and OFF data representing ON dots to be printed and OFF dots that are not printed, respectively, each of said block data having associated weight data related to the number of ON data in said associated block data, each of the block data comprising an associated plurality of sub-block data and when the printing pattern data is character pattern data, the block data corresponds to character data for one character;

processing means for performing a sequential adding operation on the weight data associated with each of the block data in the line, said processing means comprising dot density determination means for determining the dot density of the block data based on a number of ON dots in the corresponding block data, said dot density determination means including a dot number table for generating the number of said ON dots for each of the sub-block data inputted thereto, referring means for sequentially reading out the sub-block data in the block data when the printing pattern data is graphic pattern data, for sequentially reading out the sub-block data when the printing pattern data is character pattern data, and for referring to said dot number table to generate the number of ON dots for the read-out sub-block data, dot adding means for sequentially adding the generated number of ON dots in said associated sub-block data for each of said block data to obtain the total number of ON dots separately for each of said block data, ratio calculating means for calculating a ratio of the total number of ON dots to the number of dots in the block data when the printing pattern data is graphic pattern data, and for calculating a ratio of the ON dots to the number of dots in the read-out sub-block when the printing pattern data is character pattern data, in order to determine the dot density;

said processing means further including weight data determination means for determining weight data based on the determined dot density and adding means for performing the sequential adding operation on the weight data associated with each of the block data in the line;

determination means for determining how many times divisional printing should be performed when an added result of the sequential adding operation exceeds a predetermined value during the sequential adding operation; and printing means for printing the printing pattern in accordance with the determined number of times the divisional printing should be performed.

4. The printer according to claim 1, wherein the weight data determination means comprises:
a weight data table for generating said weight data according to the determined dot density input thereto; and weight data referring means for referring to said weight data table to generate the weight data for the determined dot density.

5. The printer according to claim 1, wherein the weight data is positive when the corresponding dot density is higher than a given value, and is negative when the corresponding dot density is lower than the given value.

6. The printer according to claim 5, wherein said adding means further comprises means for setting the added result to "0" when the added result is negative during the sequential adding operation.

7. The printer according to claim 1, further comprising means for determining that divisional printing should not be performed when the added result does not exceed said predetermined value during the sequential adding operation.

8. The printer according to claim 1, further comprising data storage means for receiving transmitted data from an external apparatus, for storing the transmitted data in said memory means as the printing pattern data when the transmitted data is graphic pattern data, and for covnerting the transmitted data into printing pattern data to store the converted printing pattern data in said memory means when the transmitted data is character code data.

9. A method of confirming that printing pattern data for each line to be printed has a high-density and for performing divisional printing, wherein the printing pattern data comprises at least one block data, each of the block data comprising ON data and OFF data representing ON dots to be printed and OFF dots that are not printed, respectively, each of said block data having associated weight data related to the number of ON data in said associated block data, each of the block data comprising an associated plurality of sub-block data, the method comprising the steps of:

performing a sequential adding operation on the weight data associated with each of the block data in the line, said step of performing including the substep of determining the dot density of the block data based on the number of ON dots in the corresponding block data, said substep of determining including the further sub-steps of sequentially reading out the sub-block data in the block data, referring to a dot number table in accordance with the read-out sub-block data to obtain a number of ON dots in the read-out sub-block data, sequentially adding the obtained number of ON dots in said associated sub-block data for each of said block data for each of said block data to obtain the total number of ON dots separately for each of said block data, and calculating a ratio of the total number of ON dots to the number of dots in the block data, to determine the dot density, said step of performing further including the sub-steps of determining the weight data baesd on the determined dot density; and processing the sequential adding operation on the weight data from the leading block data to the last block data, determining how many times divisional printing should be performed, when the added result of the sequential adding operation exceeds a predetermined value during the sequential adding operation; and printing the printing pattern data in accordance with the determined number of times the divisional printing should be performed.

10. The method according to claim 9, wherein the printing pattern data is either character pattern data or graphic pattern data, and when the printing pattern data is character pattern data, the block data corresponds to character pattern data for one character.

11. A method of confirming that printing pattern data for each line to be printed has a high-density and for performing divisional printing, wherein the printing pattern data comprises at least one block data, each of the block data comprising ON data and OFF data representing ON data to be printed and OFF data that are not printed, respectively, each of said block data having associated weight data related to the number of ON data in said associated block data, wherein each of the block data comprises an associated plurality of sub-block data, and when the printing pattern data is character pattern data the block data corresponds to character pattern data for one character, the method comprising the steps of:

performing a sequential adding operation on the weight data associated with each of the block data in the line, said step of sequential adding including the sub-steps of determining the dot density of the block data based on the number of ON dots in the corresponding block data;

determining the weight data based on the determined dot density, and processing the sequential adding operation on the weight data from the leading block data to the last block data, said sub-step of determining the dot density of the block data including the additional sub-steps of sequentially reading out sub-block data selected for every predetermined number of the sub-block data when the printing pattern data is character pattern data, referring to a dot number table in accordance with the read-out sub-block data to obtain a number of ON dots in the read-out sub-block data, sequentially adding the obtained number of ON dots in said associated sub-block data for each of said block data to obtain a total number of ON dots separately for each of said block data, calculating a ratio of the total number of ON dots to the number of dots in the block data when the printing pattern data is graphic pattern data, and calculating a ratio of the number of said ON dots to the number of dots in the read-out sub-block data when the printing pattern data is character pattern data;

determining how many times divisional printing should be performed at the time that the added result of the sequential adding operation exceeds a predetermined value during the sequential adding operation; and printing the printing pattern data in accordance with the determined number of times the divisional printing should be preformed.

12. The method according to claim 9, wherein said sub-step of determining the weight data compries the step of referring to a weight data table in accordance with determined number of ON dots to obtain the weight data.

13. The method according to claim 9, wherein the weight data is positive when the corresponding dot density is higher than a given value, and negative when the corresponding dot density is lower than the given value.

14. The method according to claim 9, wherein said step of performing the sequential adding operation further comprises the step of setting the added result to zero when the added result is negative during the sequential adding operation.

15. The method according to claim 9, further comprising the step of determining that divisional printing should not be performed, when the added result of the sequential adding step does not exceed the predetermined value during the sequential adding operation.

16. The method according to claim 9, further comprising:

receiving transmitted data from an external apparatus;

storing the transmitted data in said memory means as printing pattern data when the transmitted data is graphic pattern data; and converting the transmitted data into printing pattern data to store the converted printing pattern data in said memory means when the transmitted data is character code data.

* * * * *

UNITED STATES PATENT AND TRADEMARK OFFICE
CERTIFICATE OF CORRECTION

PATENT NO. : 4,765,763

DATED : August 23, 1988

INVENTOR(S) : Takao Ishikawa

It is certified that error appears in the above-identified patent and that said Letters Patent is hereby corrected as shown below:

Claim 1, column 6, line 58, change "hot" to --how--.

Claim 9, column 8, line 61, change "baesd" to

--based--.

Signed and Sealed this

Twentieth Day of June, 1989

Attest:

DONALD J. QUIGG

Attesting Officer

Commissioner of Patents and Trademarks